(12) United States Patent
Fukawa et al.

(10) Patent No.: US 6,325,719 B1
(45) Date of Patent: Dec. 4, 2001

(54) CONTROLLER FOR GAME MACHINE

(75) Inventors: Takashi Fukawa; Hiroyuki Onoda, both of Yokohama (JP)

(73) Assignee: Namco, Ltd., Tokyo (JP)

( * ) Notice: Subject to any disclaimer, the term of this patent is extended or adjusted under 35 U.S.C. 154(b) by 0 days.

(21) Appl. No.: 09/251,518

(22) Filed: Feb. 17, 1999

(30) Foreign Application Priority Data

Feb. 26, 1998 (JP) .................................................. 10-045337

(51) Int. Cl.[7] ...................................................... A63F 9/24
(52) U.S. Cl. ............................................................ 463/37
(58) Field of Search ................................. 463/36–39, 30, 463/46; 345/161, 163, 158, 184, 169; 273/148 B

(56) References Cited

U.S. PATENT DOCUMENTS

| | | | |
|---|---|---|---|
| 4,246,452 | * 1/1981 | Chandler | 200/5 A |
| 4,769,721 | * 9/1988 | Kajiura | 358/342 |
| 4,866,542 | * 9/1989 | Shimada et al. | 358/335 |
| 4,933,670 | * 6/1990 | Wislocki | 463/37 |
| 5,734,373 | * 3/1998 | Rosenberg et al. | 463/30 |
| 5,854,621 | * 12/1998 | Junod et al. | 463/39 |
| 5,984,785 | * 11/1999 | Takeda et al. | 463/30 |
| 6,010,406 | * 1/2000 | Kajikawa et al. | 463/37 |

FOREIGN PATENT DOCUMENTS

| | | |
|---|---|---|
| 62-31840 | 2/1987 | (JP) . |
| 7-211196 | 8/1995 | (JP) . |
| 8-194579 | 7/1996 | (JP) . |
| 9-16306 | 1/1997 | (JP) . |

* cited by examiner

*Primary Examiner*—Jessica J. Harrison
(74) *Attorney, Agent, or Firm*—Faegre & Benson LLP

(57) ABSTRACT

It is an object of the present invention to provide a general purpose controller for a game machine by which a car game of a fishing game can be more enjoyed. A controller for a game machine comprises a jog dial 5 rotatably mounted on a controller main body 1 as a part of an input operating part, a data input system 20 driven according to and connected to the jog dial 5 to input data in accordance with the rotation of the jog dial and a counterforce urging means having a driving motor 17 or the like driving connected to the jog dial 5 for urging a counterforce opposite to the rotation thereof.

7 Claims, 5 Drawing Sheets

CONTROLLER FOR GAME MACHINE

TECHNICAL FIELD

The present invention relates to a controller for a game machine which is connected to a game machine through a wired equipment or a wireless equipment and is provided with an input operating part which can be operated by a player.

BACKGROUND

For instance, controllers for home television game machines or the like are usually equipped with six or more switches, respectively. Most of them adopt a direct push-button type as an input form for turning on/off these switches. However, with the controller of the push button type for performing an input operation, when the handle of a car game is steered or the reel of a fishing game is manipulated, these movements are too different from actual movements, so that it is hard to enjoy these games as much as possible. Thus, in order to meet this problem, an exclusively used controller has been provided depending on the kinds of games.

PROBLEMS TO BE SOLVED BY THE INVENTION

However, the exclusively used controller has been necessarily limited to a specific game or to games similar thereto with inconvenience.

Therefore, by taking the conventional circumstances mentioned above into consideration, it is an object of the present invention to provide a controller for a game machine by which a car game or a fishing game or the like can be enjoyed from the viewpoint of sense of operation and which is rich in generalization.

DISCLOSURE OF THE INVENTION

For achieving the above mentioned object, according to the present invention, there is provided a controller for a game machine connected to a game machine through a wired equipment or a wireless equipment and provided with an input operating part to be operated by a player, the controller for a game machine comprising: a circular operating part rotatably mounted on a controller main body as a part of the input operating part; a data input means driven according to and connected to the circular operating part for inputting data in accordance with the rotation thereof; and a counterforce (reactive force) urging means driving and connected to the circular operating part for urging a counterforce relative to the rotation of the circular operating part.

In this connection, it is preferable that the counterforce urging means may turn on or off its counterforce to be urged to the circular operating part.

Further, the counterforce urging means may effectively vary the magnitude of the counterforce to be urged to the circular operating part.

Furthermore, the above described counterforce urging means may be preferably provided with a driving motor driving and connected to the circular operating part and a motor control part for controlling the rotation of the driving motor.

BEST MODES FOR CARRYING OUT THE INVENTION

Now, embodiments of the present invention will be described below by referring to the accompanying drawings.

Figure 1:
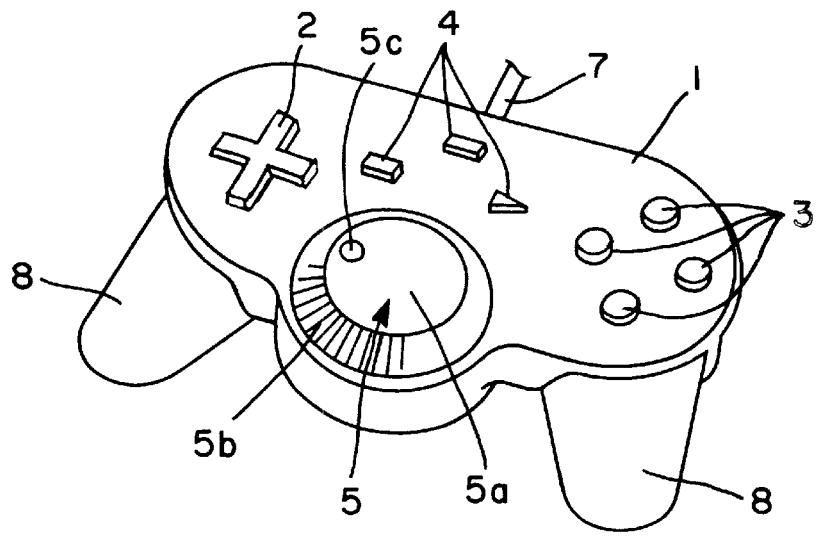
FIG. 1 is a perspective view of a controller for a game machine according to the present invention.
Figure 2:
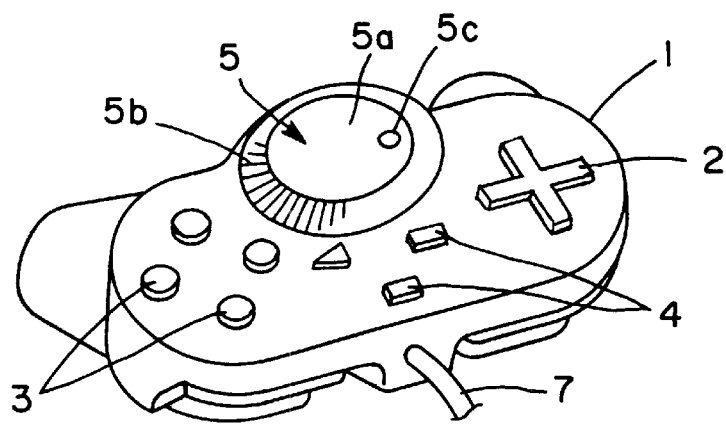
FIG. 2 is a perspective view of the controller viewed from a direction different from that in FIG. 1.
Figure 3:
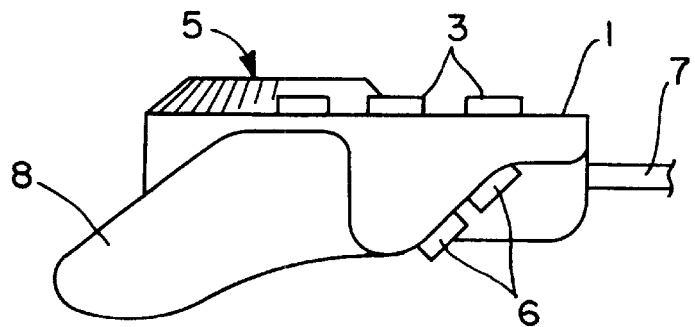
FIG. 3 is a side view of the controller shown in FIG. 1.

A controller illustrated in FIGS. 1 to 4 will be described hereinafter. In FIG. 1 in which the controller is looked from a side held by a player upon its use, reference numeral 1 designates a controller main body. An input operating part is provided on the surface of the controller main body 1. The input operating part comprises a direction key 2 for moving a character or a cursor on the screen of a game machine in the left side of FIG. 1, a plurality of operating button keys 3 for instructing executions or cancellations in the right side, button keys 4 including a start key, a select key, a mode switch key, etc,. and a jog dial 5 serving as a circular operating part at the central part of the controller main body 1. Further, on the controller main body 1, auxiliary operating button keys 6 are provided respectively in the right and left parts on the front side surface of the main body, as can be recognized in FIG. 3. The controller main body of the present embodiment is connected to a game machine through a cord 7 (wired type). However, needless to say, a controller employing an infrared radiation may be constituted without using a cord.

Figure 4:
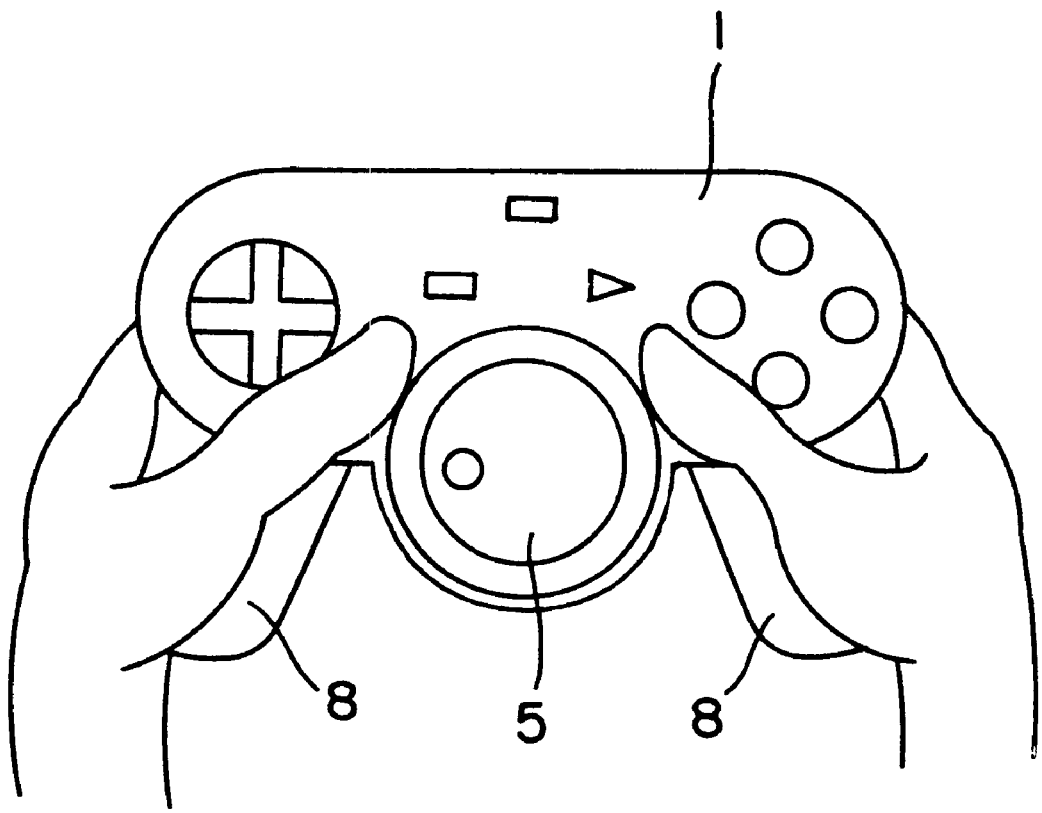
FIG. 4 is an explanatory view showing a preferable using example of the above controller.

The controller main body 1 is provided with grips 8 by which the player holds the controller main body and which are formed in the right and left parts of the rear part of the main body (right and left sides of the front part of the main body for the player). The above described jog dial 5 can be operated by the thumbs of both hands of the player while he grasps the grips 8, as illustrated in FIG. 4, and therefore, it is arranged at the central part of the front side of the controller main body 1. The jog dial 5 includes a circular upper surface part 5*a* and an inclined part 5*b* descending to a main body surface from the circumferential part of the upper surface part 5*a*. On the upper surface part 5*a*, a small depression 5*c* is formed. It is desirable to form a knurled inclined part 5*b* on the jog dial 5 so as to be readily operated.

Figure 5:
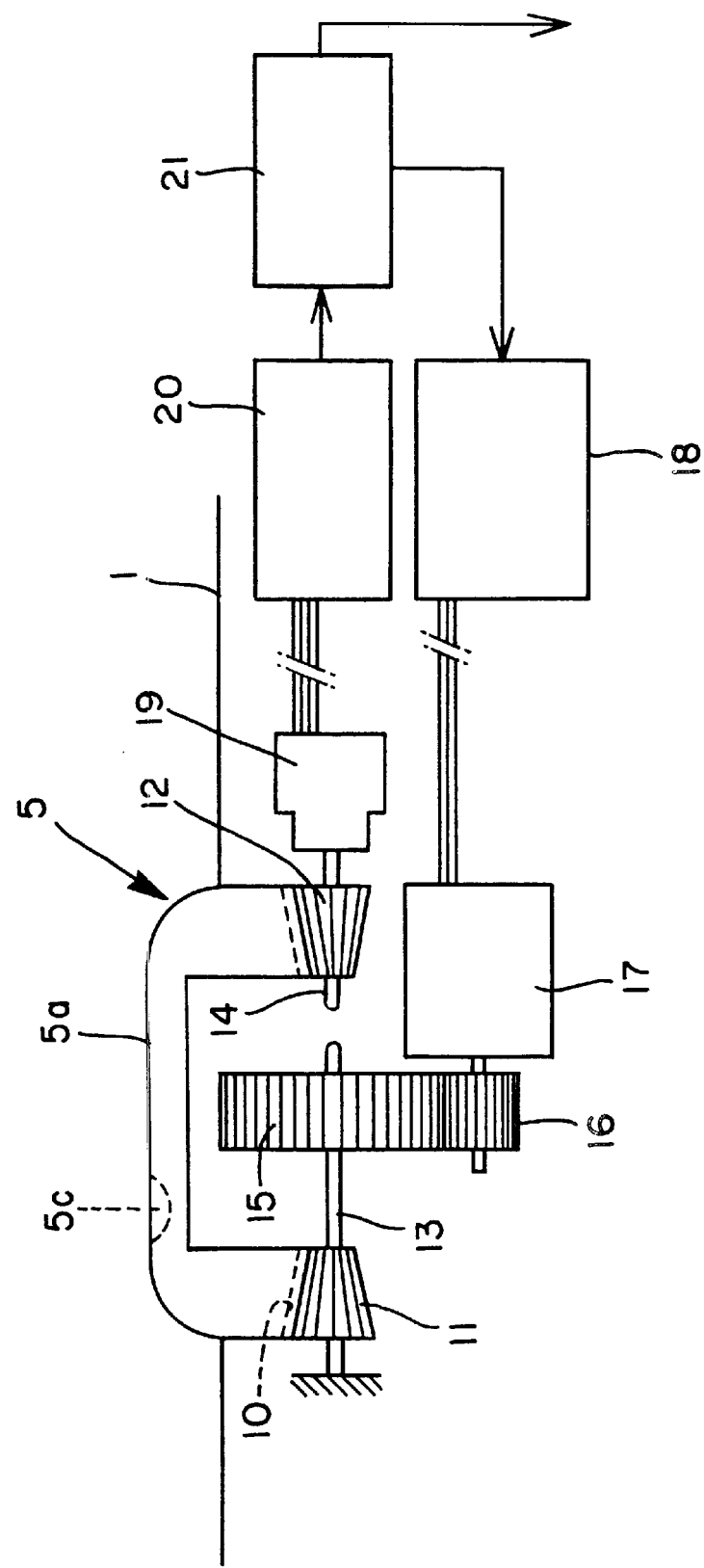
FIG. 5 is an explanatory view showing the inner structure of the above described controller.

Turning to FIG. 5, the jog dial 5 is formed in a cap shape. The bottom part of the jog dial comes into the controller main body 1. The ring shaped bottom part of the jog dial 5 is provided with an inclined bevel 10 whose outer side is high. Two bevel gears 11 and 12 mesh with the bevel 10. These bevel gears 11 and 12 are supported by respectively independent rotating shafts 13 and 14. A torque transfer gear 15 is fixed to one rotating shaft 13. The torque transfer gear 15 is connected to a driving motor 17 which can be normally and reversely rotated through another gear 16. The drive of the driving motor 17 is controlled by a motor control system 18. A reaction urging means of the present embodiment comprises the torque transfer gear 15, the gear 16, the driving motor 17 and the motor control system 18. On the other hand, a rotary encoder 19 is connected to the rotating shaft 14 in the side opposite to the bevel gear 12 with the jog dial 5 sandwiched in between the rotary encoder 19 and the bevel gear. Data such as a rotating direction and rotating speed detected by the rotary encoder 19 is outputted to a data input system 20.

The motor control system 18 and the data input system 20 supplies a signal to and receives a signal from the control part of the game machine main body (not shown) through a communication system 21 provided in the controller main body 1. In other words, the signal of the data input system 20 is sent to the game machine main body through the communication system 21 and the signal of the control part based on a game program is sent to the motor control system 18 from the game machine main body. In this case, a rotary variable register may be employed in place of the above described rotary encoder 19.

In the controller for the game machine constructed as mentioned above, when the player rotates the jog dial 5 in a certain direction, for example, clockwise, the rotating shaft 14 is rotated through the gear 12, the movement of the rotating shaft is detected by the rotary encoder 19 and a data signal is outputted to the control part of the game machine through the communication system 21 from the data input system 20. The control part of the game machine responds to this data signal, a signal for rotating and driving the jog dial 5 counterclockwise is outputted to the motor control system 18 and the motor 17 is rotated and driven in response to the signal. When the motor 17 is rotated, a counterforce serving as torque in a direction opposite to the direction in which the player rotates the jog dial 5 is exerted upon the jog dial 5. At this time, the player needs a force to some degree in order to maintain the rotation of the jog dial 5 and feels heavy at the time of operating the jog dial 5. Further, when the player separates his hands from the rotating jog dial 5 to make it free, he can also control the jog dial to be returned to its original position by virtue of the torque of the motor 17. In addition, since the counterforce urged in such a manner can be exerted both on rightward and leftward directions, when the jog dial 5 is made free like the handle of a car during its travelling, the jog dial can be always controlled to return to its original position.

The counterforce can be exerted upon the jog dial 5 in such a manner, so that a controller suitable for a driving game can be provided. Further, such a control as to increase the counterforce acting on the jog dial 5 as the speed of the character of a car operated by the player increases can be also easily carried out. Furthermore, when it is assumed that a car travels on a bad road such as a gravel road, a control can be also performed as if a handle could not be skillfully manipulated by giving a mincing counterforce thereto.

Besides, the jog dial 5 is rotated in a prescribed direction, so that its rotating movement can also correspond to the action of a reel of a fishing game. Also, in this case, the magnitude of the counterforce can be controlled so as to be properly changed depending on the kind, size, etc. of caught fish. Furthermore, with the construction of the present invention, since the driving motor 17 can be controlled so as to be readily turned on/off, when the caught fish escapes, the driving motor may be turned off so as to turn off the counterforce to meet this incident.

Figure 6:
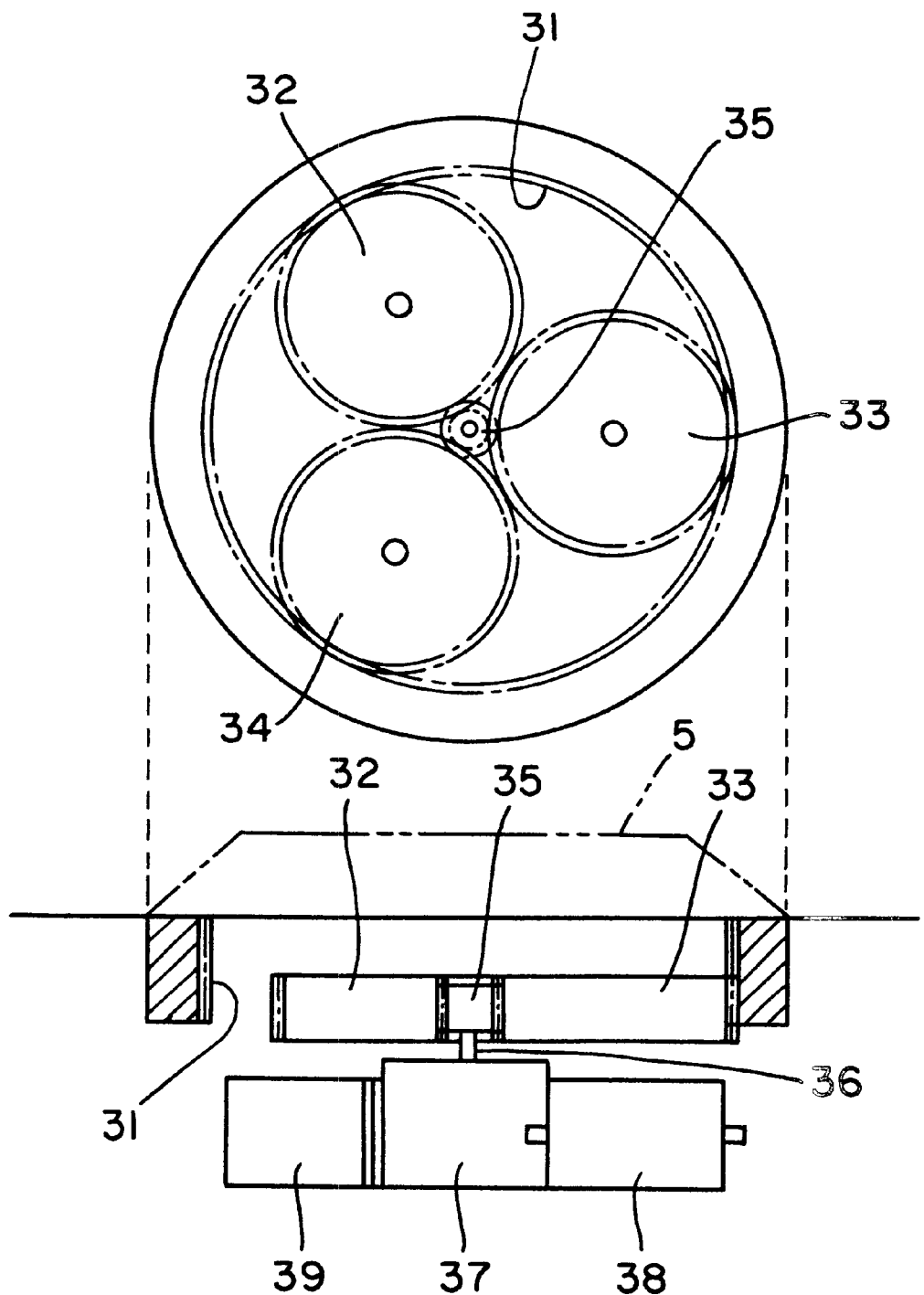
FIG. 6 is an explanatory view showing a jog dial part in another embodiment of a controller for a game machine according to the present invention.

FIG. 6 is an explanatory view showing a jog dial part in another embodiment of the present invention. In this embodiment, the teeth of a gear 31 are formed on the inner peripheral surface of a jog dial 5. Three planetary gears 32, 33 and 34 engage with the teeth of the gear 31 at respectively different positions. These planetary gears 32, 33 and 24 also engage with a sun gear 35 arranged at the center thereof. A motor 38 is connected to the rotating shaft 36 of the sun gear 35 through a gear mechanism 37. Further, the gear mechanism 37 is provided with a data input system 39 for detecting the rotating direction and rotating speed of gears therein by a rotary encoder, etc., not shown and inputting the data thereof.

In the controller for the game machine constructed as described above, when the jog dial 5 is rotated, the rotating operation of the jog dial is transmitted to the gear mechanism 37 through the gear 31, the planetary gears 32, 33 and 34 and the sun gear 35, and the rotating data is obtained by the data input system 39. Further, when the driving motor 38 is driven, the counterforce is given to the jog dial 5 through the gear mechanism 37, the planetary gears 32, 33 and 34 and the gear 31, hence effects similar to those of the first embodiment can be obtained.

Now, examples of operation of the controller for the game machine according to the present invention will be described with reference to FIG. 7.

Figure 7A:
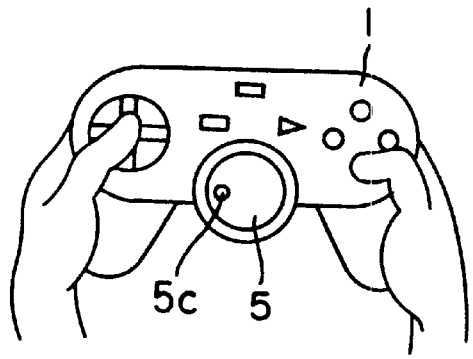
FIG. 7 shows explanatory views showing the employment examples of the controller according to the present invention and FIGS. 7(*a*) to 7(*e*) show respectively different employment methods.
Figure 7D:
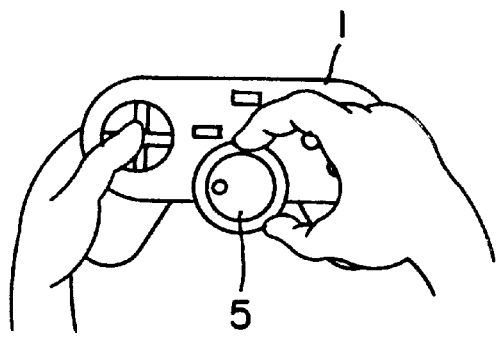
Figure 7B:
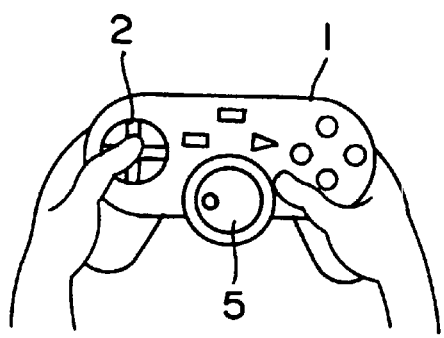
Figure 7E:
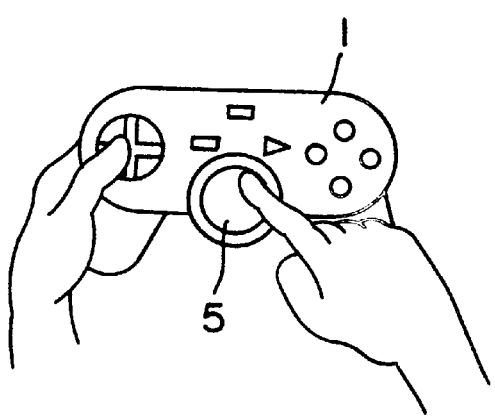
Figure 7C:
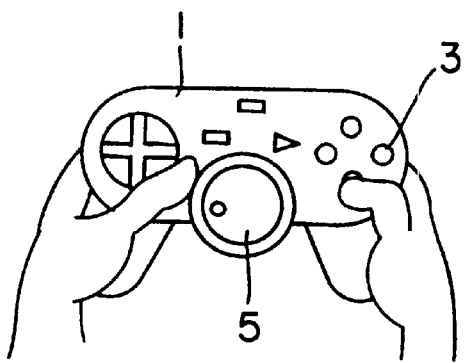

FIG. 7(a) shows a state in which the controller is used as a general purpose controller which is a standard controller using no jog dial 5. FIG. 7(b) shows a state in which a direction key 2 is operated by a left hand and the jog dial 5 is operated by a right hand. FIG. 7(c) shows a state in which the jog dial 5 is operated by the left hand and an operating key 3 is operated by the right hand. Fig.7(d) shows a state in which the inclined part 5b of the jog dial 5 is picked up and operated. FIG. 7(e) shows a state in which a depression 5c is touched with a finger to rotate the jog dial 5.

As mentioned above, there are various kinds of operating methods of the jog dial 5. Further, since the controller can be operated without using the jog dial 5, the controller of the present invention can be used exclusively not only for a prescribed game machine but also for various types of games.

The counterforce urging means for exerting the counterforce on the jog dial 5 of the present invention is not limited to that of the above mentioned embodiments. For example, as long as the counterforce can be generated by the driving motor, a variety of gear mechanisms can be used. In addition, a plurality of driving motors may be employed.

EFFECTS OF THE INVENTION

What is claimed is:

1. A controller for a game machine provided with an input operating part to be operated by a player, said controller for a game machine comprising:

a circular operating part rotatably mounted on a controller main body as a part of said input operating part;

a data input means driven according to and connected to said circular operating part to input data in accordance with the rotation of the circular operating part; and a counterforce urging means driving and connected to the circular operating part to urge a counterforce opposite to the rotation thereof wherein said counterforce urging means includes a driving motor driving and connected to the circular operating part and a motor control part for controlling the rotation of the driving motor.

2. A controller for a game machine according to claim 1, wherein said counterforce urging means includes means for turning on and off the counterforce.

3. A controller for a game machine according to claim 1, wherein said counterforce urging means includes means for varying the magnitude of the counterforce to be urged to said circular operating part.

4. A controller for a game machine according to claim 1, wherein the controller is connected to the game machine through a wired connection.

5. A controller for a game machine according to claim 1, where in the controller is connected to the game machine through a wireless connection.

6. A method of operating a controller for a game machine of the type having an input operating part to be operated by a player comprising the steps of:
 - a). grasping an inclined part of a rotatable jog dial circular input operating part mounted on a controller main body;
 - b). rotating the jog dial to input data via a data input means in accordance with rotation of the circular input operating part; and
 - c). applying a counterforce to the circular input operating part to urge a counterforce opposite to the rotation of the circular input operating part using a driving motor driving and connected to the circular operating part and a motor control part for controlling the rotation of the driving motor.

7. A method of operating a controller for a game machine of the type having an input operating part to be operated by a player comprising the steps of:
 - a). inserting a finger into a depression in a rotatable jog dial circular input operating part mounted on a controller main body;
 - b). rotating the jog dial to input data via a data input means in accordance with rotation of the circular input operating part; and
 - c). applying a counterforce to the circular input operating part to urge a counterforce opposite to the rotation of the circular input operating part using a driving motor driving and connected to the circular operating part and a motor control part for controlling the rotation of the driving motor.

* * * * *